United States Patent [19]

Stuart

[11] 3,811,525

[45] May 21, 1974

[54] FLUID POWER TRANSMISSION AND CONTROL SYSTEM FOR FLUID MOTORS FOR DRIVING THE FRONT WHEELS OF A VEHICLE

[75] Inventor: Douglas Stuart, Edinburgh, Scotland

[73] Assignee: Carron Hydraulics Limited, Kirkcaldy, Fife, Scotland

[22] Filed: May 24, 1972

[21] Appl. No.: 256,441

[30] Foreign Application Priority Data
May 26, 1971 Great Britain.................... 17115/71

[52] U.S. Cl.................. 180/44 M, 60/464, 60/484, 180/66 R
[51] Int. Cl............................................. B60k 17/30
[58] Field of Search.... 180/44 F, 44 M, 43 R, 66 R; 60/464, 484

[56] References Cited
UNITED STATES PATENTS

| | | | |
|---|---|---|---|
| 3,053,043 | 9/1962 | Knowler | 180/44 M |
| 3,458,005 | 7/1969 | Malm et al. | 180/44 M |
| 3,480,099 | 11/1969 | Nighswonger et al. | 180/44 M |
| 3,702,642 | 11/1972 | Greene | 180/44 M |

FOREIGN PATENTS OR APPLICATIONS

| | | | |
|---|---|---|---|
| 142,541 | 12/1961 | U.S.S.R. | 180/44 M |
| 1,285,089 | 8/1962 | France | 180/44 M |

Primary Examiner—Kenneth H. Betts
Attorney, Agent, or Firm—Hauke, Gifford, Patalidis & Dumont

[57] ABSTRACT

The invention provides for a fluid power transmission and control system for fluid motors directly connected to the front wheels of a vehicle such that no reduction gearing is required between the mechanical output members of the fluid motors and the wheels driven by the motors, the rear wheels of the vehicle being driven by mechanical power transmission in known manner. The system also provides for selecting two wheel drive by mechanical transmission or four wheel drive by mechanical transmission to the rear wheels and fluid power transmission to the front wheels.

4 Claims, 1 Drawing Figure

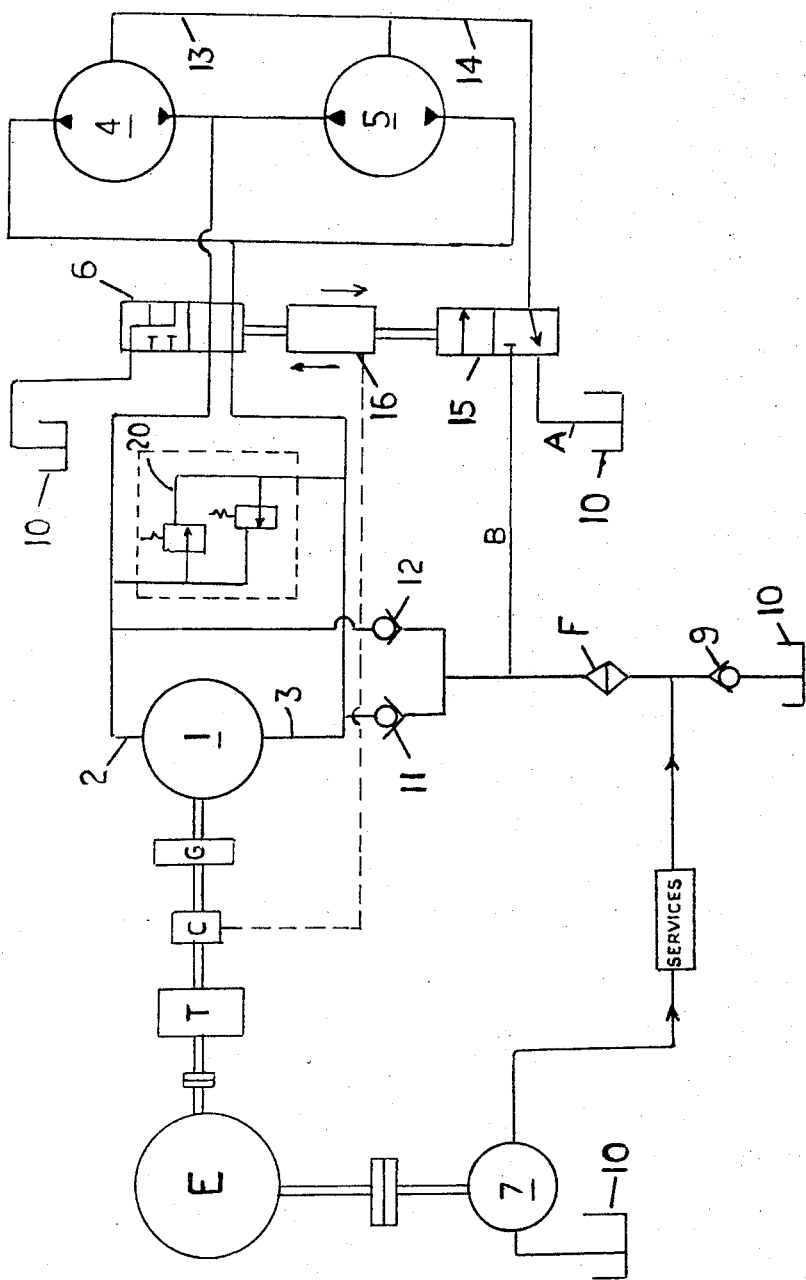

FLUID POWER TRANSMISSION AND CONTROL SYSTEM FOR FLUID MOTORS FOR DRIVING THE FRONT WHEELS OF A VEHICLE

This invention relates to a fluid power transmission and control system for fluid motors for driving the front wheels of a vehicle.

More particularly the invention provides a fluid power transmission and control system for high torque fluid motors fitted to the steering front wheels of a vehicle such as a tractor or other self-propelled farm machinery or earth moving equipment, such that no reduction gearing is used between the mechanical output members of the fluid motors and the wheels driven by the motors, the fluid motors being mounted directly to the wheels.

It is already known to drive the steering front wheels of a tractor and the like vehicle by means of fluid motors connected to the steering wheels by mechanical gear reduction units.

It is therefore an object of this invention to provide an improved fluid transmission and control system for fluid motors directly connected to the front wheels of a tractor or the like vehicle.

Another object of the invention is to provide facilities for four wheel drive in the low speed range of a tractor or the like and a two wheel mechanical drive with the front wheel motors engaged in a free-wheeling condition in the higher speed range.

According to the invention a vehicle having an engine drivingly connected by mechanical power transmission means to its rear wheels and a fluid power transmission and control system operable to selectively drive fluid motors directly drivingly connected to respective front steering wheels, said system comprising a main hydraulic pump operatively connectible to the mechanical transmission such that its fluid output is directly proportional to the ground speed of the driven rear wheels of the vehicle so that when said main pump fluid output is supplied to said fluid motors the latter are driven at a speed having a predetermined proportional relationship with the ground speed of the rear wheels, a closed fluid circuit from said main pump connectible through first valve means to said fluid motors, an auxiliary hydraulic pump operatively connected to said engine, a fluid path from said auxiliary pump connectible through second valve means with the fluid motors to enable the auxiliary pump to pressurize the fluid motors to put the latter in their free-wheeling states, and control means to enable the selective actuation of said first and second valve means so as to connect, and disconnect, the transmission and control system to drive, and from driving, the fluid motors, said disconnection being simultaneous with said pressurizing of the fluid motors by the auxiliary pump.

The rear wheels of a vehicle are driven in well known manner by mechanical transmission connected to an engine and a main hydraulic pump which drives the fluid motors is driven by the mechanical transmission such that its rotational speed is directly proportional to the ground speed of the driven rear wheels of the vehicle.

The main pump is of the type in which reversal of the direction of the mechanical input to the pump reverses the fluid flow through the pump and therefore the direction of rotation of the fluid motors driven by the pump so that a change in the direction of rotation of the pump drive could only occur by changing the direction of rotation of the rear wheels of the tractor since these are driven by the same mechanical input.

The fluid motors are of the axial or radial free piston type in which by application of low fluid pressure to the motor casing together with the coupling of the main supply ports of the motor to the fluid supply tank the pistons are forced to the inner dead centre position. In this condition the motor can be free wheeled in either direction by external force since thp pistons are completely disconnected from their respective cam-rings.

A preferred embodiment of the invention is illustrated by way of example in the accompanying drawing which shows a schematic diagram of a fluid power transmission and control system for operating high torque fluid motors mounted on the steering front wheels of a vehicle.

Referring to the drawing a vehicle engine denoted by the letter E is mounted in known manner in a vehicle and is operatively connected in known manner by mechanical transmission gearing T, to drive the rear wheels of a vehicle (not shown).

A fluid motor 4,5 is drivingly connected directly to each of the front wheels of the vehicle without reduction gear.

A main hydraulic pump 1 is connected, either directly or through clutch means C and gear box G (as illustrated) to the power take-off shaft of the mechanical transmission T which drives the pump.

The main hydraulic pump 1 is of known type in which reversal of the direction of the mechanical driving input reverses the fluid flow through the pump.

The main hydraulic pump 1 has its fluid ports 2 and 3 connected by a "closed" loop circuit to two fluid motors 4 and 5 respectively, through a main control valve 6 shown in the four-wheel drive condition. The fluid motors may be connected in parallel as illustrated or connected in series. A boost fluid supply is provided for the closed loop circuit by an auxiliary pump 7 driven directly by the vehicle engine E. In the case of a tractor the auxiliary pump 7 comprises the tractor services pump. The return fluid flow from the tractor services pump 7 is passed through a low pressure relief valve 9 to a fluid supply tank 10 and the inlet flow to the relief valve 9 is connected to the ports 2,3 of the main pump 1 through a filter F and two non-return valves 11 and 12.

In this manner external leakage from the "closed" loop circuit is replenished at a pressure above atmospheric.

In order to permit free wheeling of the fluid motors 4 and 5, fluid drain lines 13 and 14 from the motors are connected through a valve 15 in the return fluid flow circuit of the auxiliary pump 7 to the fluid tank 10 so that by moving the valve 15 from the position A shown in the drawing to position B the fluid motor drain lines are connected to a pressurised source from the auxiliary pump 7 to pressurize the motor casings and move the pistons to the inner dead centre positions.

The main control valve 6 and valve 15 are coupled by mechanical coupling means 16 (which may include another clutch) to drive clutch C for the main pump 1 thus allowing the valves 6 and 15 to be operated simultaneously with the engaging or disengaging of the main pump drive. The coupling means 16 thus constitutes the sole control for the selection of four-wheel drive.

In operation, immediately the engine is started, the auxiliary pump 7 pressurises the "closed" loop circuit for transmission of the fluid motors, Assuming the transmission clutch C is disengaged, the valves 6 and 15 are in the two-wheel drive position and the fluid motors on the front wheels are in the free-wheel condition. The vehicle could therefore be driven away in the normal manner using the mechanical drive to the two rear wheels only.

When the clutch C is engaged the valves 6 and 15 are moved to the four-wheel drive position and the main pump 1 is rotated with the rear mechanically driven wheels and rotates at a rate proportional to that of the rear wheels. Rotation of the pump 1 results in a discharge of fluid from the pump to the fluid motors on the front wheels to give a flow sufficient to drive the front wheels at theoretical ground speed slightly higher than that of the rear wheels resulting in a slightly higher rate of slippage at the front wheels as compared with the rear wheels.

This feature is designed to compensate for the small speed loss incurred in the wheel motors due to internal and external fluid loss from the "closed" loop circuit.

Operation of the system in reverse is automatic since selection of reverse in the mechanical transmission to the rear wheels reverses the direction of rotation of the main pump and hence the direction of fluid flow to the motors on the front wheels.

The main pump 1 may be directly connected to the mechanical transmission to rotate continuously in which case the coupling means 16 is constituted by a manually operable selector switch to actuate the valves 6 and 15 simultaneously and by-pass valves 20 circulate the fluid round the "closed" loop circuit when the valves 6 and 15 are in the two-wheel drive position allowing the fluid motors to free-wheel.

What is claimed is:

1. A vehicle having an engine drivingly connected by mechanical power transmission means to its rear wheels and a fluid power transmission and control system operable to selectively drive fluid motors directly drivingly connected to respective front steering wheels, said system comprising a main hydraulic pump operatively connectible to the mechanical transmission such that its fluid output is directly proportional to the ground speed of the driven rear wheels of the vehicle so that when said main pump fluid output is supplied to said fluid motors the fluid motors are driven at a speed having a predetermined proportional relationship with the ground speed of the rear wheels, a closed fluid circuit from said main pump connectible through first valve means to said fluid motors, an auxiliary hydraulic pump operatively connected to the engine, a fluid path from said auxiliary pump connectible through second valve means with the fluid motors to enable the auxiliary pump to pressurize the fluid motors to put the fluid motors in their free-wheeling states, and control means to enable the selective actuation of said first and second valve means so as to connect, and disconnect, the transmission and control system to drive, and from driving, the fluid motors, said disconnection being simultaneously with said pressurizing of the fluid motors by the auxiliary pump.

2. A vehicle as claims in claim 1 in which the fluid control means includes a clutch operatively connecting the main pump to the mechanical transmission, coupling means operatively associated with the clutch to effect said connecting and disconnecting actuation of said valves in response to said clutch being engaged and disengaged, respectively.

3. A vehicle according to claim 1 wherein a relief valve circuit is provided across the main pump so that driving of the main pump when said transmission and control system is disconnected from said fluid motors serves only to circulate pressure fluid through the relief valve circuit.

4. A vehicle according to claim 1 wherein said auxiliary pump further functions as a make-up pump for the low-pressure side of the closed circuit of the main pump.

* * * * *

UNITED STATES PATENT OFFICE
CERTIFICATE OF CORRECTION

Patent No. 3,811,525          Dated May 21, 1974

Inventor(s) Douglas Stuart

It is certified that error appears in the above-identified patent and that said Letters Patent are hereby corrected as shown below:

Col. 2, line 10, delete "thp" and insert --the--;
       line 30, after "transmission", insert --gearing--;
       line 53, after "motors", insert --4 and 5--;
       line 64, delete "main".

Col. 3, line 1, after "immediately", insert --when--;
       line 1, after "engine", insert --E--;
       line 2, delete "pressurises" and insert --pressurizes--;
       line 5, after "motors", insert --4 and 5--;
       line 11, delete "main";
       line 15, after "motors", insert --4 and 5--;
       line 30, after "main", insert --hydraulic--.

Signed and sealed this 8th day of October 1974.

(SEAL)
Attest:

McCOY M. GIBSON JR.
Attesting Officer

C. MARSHALL DANN
Commissioner of Patents